M. M. CLOUGH.
Leather-Skiving Machine.
No. 218,163. Patented Aug. 5, 1879.
Fig. 1.
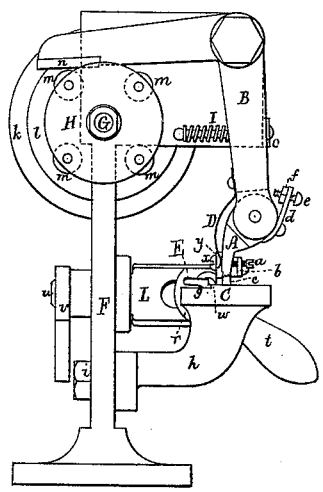
Fig. 5.
Fig. 2.
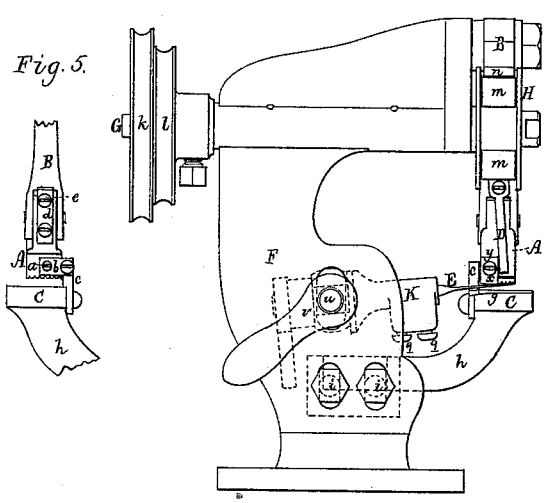
Fig. 3.
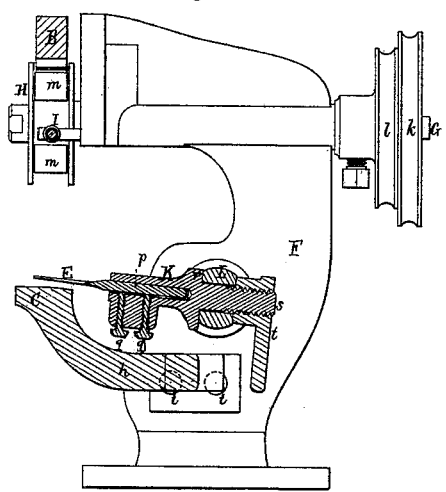
Fig. 4.
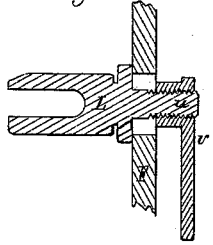
Fig. 7.
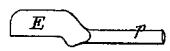
Fig. 6.
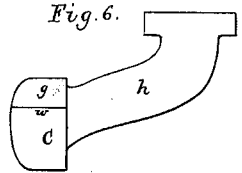
Witnesses
S. N. Piper
W. W. Lims
Inventor
Morton M. Clough,
by attorney
R. H. Eddy
N. PETERS, PHOTO-LITHOGRAPHER, WASHINGTON, D.C.

UNITED STATES PATENT OFFICE.

MORTON M. CLOUGH, OF MARLBOROUGH, MASSACHUSETTS.

IMPROVEMENT IN LEATHER-SKIVING MACHINES.

Specification forming part of Letters Patent No. 218,163, dated August 5, 1879; application filed May 12, 1879.

*To all whom it may concern:*

Be it known that I, MORTON M. CLOUGH, of Marlborough, of the county of Middlesex and State of Massachusetts, have invented a new and useful or Improved Machine for Skiving Leather or Various other Materials; and do hereby declare the same to be described in the following specification and represented in the accompanying drawings, of which—

Figure 1 is a front-end elevation, and Fig. 2 a side view, of it. Fig. 3 is a longitudinal section taken through the knife and its supporting devices. Fig. 4 is a section of the furcated arm, its clamping-screw, and armed nut, to be hereinafter described. Fig. 5 is a rear-side view of the bed and knife, and the reciprocating feeder, and certain devices appurtenant thereto.

The nature of my invention is defined in or by the claim or claims hereinafter presented.

In this machine the feeding of the leather to the knife is effected by a reciprocating pawl or feeder, which has compound motions—that is to say, while in operation it moves down upon and advances the leather, and next moves up from it and retreating. This feeder is shown at A as projecting down from and hinged to the lower arm of a right-angular lever, B, and arranged immediately over the bed C, in manner as represented. A spring, D, fixed to the lever and bearing against the feeder, serves to press the latter toward an adjustable back stop or screw, $a$, screwed through a projection, $b$, from a guide, $c$, extending up from the bed. This back-stop, by the feeder being carried against it, causes the feeder to so rise above the bed as to enable a counter or piece of leather to be skived to be readily passed between the feeder and the bed.

Furthermore, there is to the feeder an arm, $d$, which extends upward from it, in manner as represented, and is provided with a screw, $e$, that screws through the arm, and is furnished with a set-nut, $f$. The said arm $d$ and screw $e$ serve to limit the depression of the feeder during its advance, as occasion may require, as the point of the screw, by bringing up against the lever B, estops the feeder in its downward movement toward the bed.

The bed C, where under the knife E, is notched or depressed, as shown at $g$, and especially in Fig. 6, which is a top view of the bed and its sustaining-arm $h$. The arm I fasten to the standard F by screws $i\ i$, going through short vertical slots in the standard, such being also shown in Fig. 2. By such means I can adjust the bed relatively to the feeder from time to time as the latter may become worn.

By having the depression $g$ in the bed the leather, when extending under the knife, is prevented from pressing up against the knife, and may thereby be easier turned on the bed, as occasion may require. Furthermore, the bed is so constructed and arranged with its supporting-arm that the hand of an operative, while holding and guiding the leather or counter while it may be in the act of being skived, can easily pass around and under or about the bed to great advantage.

The standard supports in suitable bearings the driving-shaft G, provided at one end with pulleys $k\ l$, and at the other with a grooved wheel, H, carrying a series of friction-wheels, $m$, arranged in it as represented, they being to operate simultaneously against the upper arm of the lever B, or a flat piece or cushion of leather or rubber, $n$, fixed thereto and arranged as shown, the object of such piece of leather being to prevent noise, such as would result were each of the friction-wheels during its orbital revolution to impinge directly against the lever.

A spring, I, suitably supported and applied to the lower arm of the lever B, serves to move the lever in the opposite way in which it is moved by either of the wheels $m$, the lever bringing up against a back-stop, $o$, projecting from the standard. This back-stop I prefer to have somewhat elastic rather than rigid.

The knife E, formed as shown in top view in Fig. 7, has a round shank, $p$, which is flattened on its lower side, to enable the clamping-screws $q\ q$ to securely hold the knife in its carrier K. The said carrier has projecting from a shoulder, $r$, a clamp-screw, $s$, and an armed nut, $t$. The cylindrical shank of the screw is placed between the prongs of a furcated arm, L, that projects horizontally from the standard, and is provided with a clamp-screw, u, to go through and turn in the standard, there being to such screw an armed nut, r, as shown.

By means of the furcated arm L, revoluble in the standard, the angular position of the knife lengthwise of it to the bed may be varied. So, by means of the knife-carrier, revoluble in the furcated arm and movable lengthwise thereof, not only can the knife be adjusted transversely of its blade to the proper angle to the bed, but it can be moved nearer to or farther from the bed-shoulder w, as occasion may require.

There is fixed to the feeder by a screw, x, a presser or piece of leather, y, which, projecting down to, or nearly down to, the lower end of the feeder, serves to prevent a counter or piece of leather, while being advanced to the knife for the purpose of being skived thereby, from folding, cockling, or wrinkling between the knife and the feeder. At its lower end the feeder is to be properly toothed or made rough, for it not to slip on the leather while advancing it on the bed.

From the above it will be seen that on the driving-shaft being revolved there will be imparted to the feeder reciprocating movements over the bed, and with respect to it and the knife, whereby the strip of leather or material to be skived will be intermittently advanced to the knife and forced against and cut by it, the little presser applied to the feeder serving to prevent wrinkling of the leather between the said feeder and the knife.

What I claim as my invention is as follows:

1. The reciprocating feeder A, pivoted to the lever B, and provided with the spring D, arm d, and screw e, in combination with the bed C and the back-stop a, applied thereto, all being adapted to operate with the knife, substantially as set forth.

2. The combination of the series of friction-wheels and their carrier-wheel applied to the driving-shaft with the angular lever and the spring and stop applied to the standard, such being for advancing and retracting the feeder, and for estopping the lever, as may be required.

3. The bed C, as made with the depression g and shoulder w arranged in it, substantially as and for the purpose set forth.

4. The combination of the rotary furcated arm, having clamping-screws, and applied, as described, to the standard, with the rotary knife-carrier, having clamping-screws, and applied to the knife and to the said furcated arm, substantially in manner as explained.

5. The combination of the bed, having the depression g, with the knife, its adjustable rotary carrier, and its supporting furcated arm, arranged and applied, and provided with clamp-screws, substantially as set forth.

6. The little presser or anti-wrinkling device y, in combination with the reciprocating feeder, and to operate therewith, substantially as and for the purpose specified.

7. The lever B, provided with the piece of leather n, arranged on it as described, in combination with the series of friction-wheels and their rotary carrier.

MORTON M. CLOUGH.

Witnesses:
S. N. ALDRICH,
E. O. BALLARD.